UNITED STATES PATENT OFFICE.

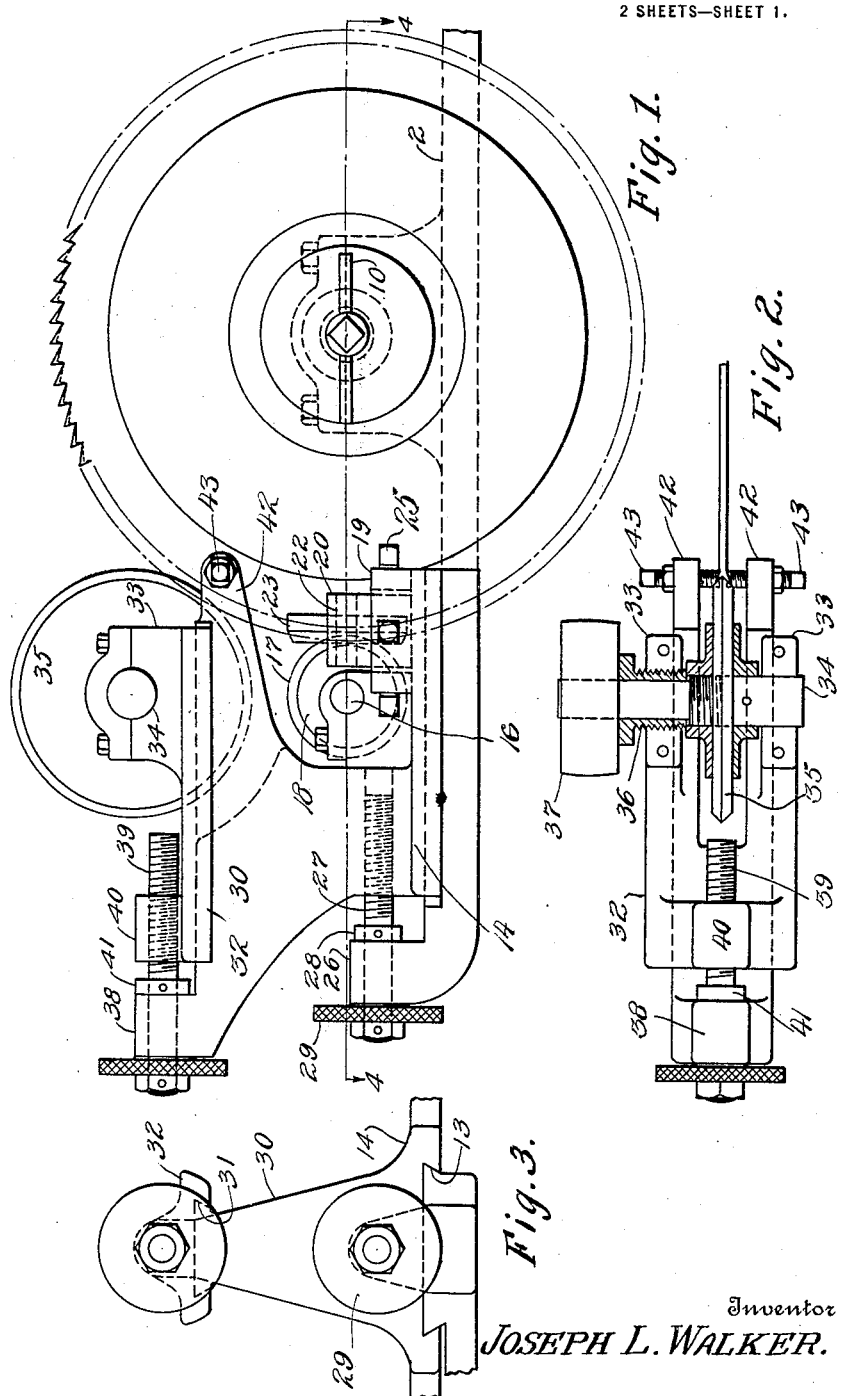

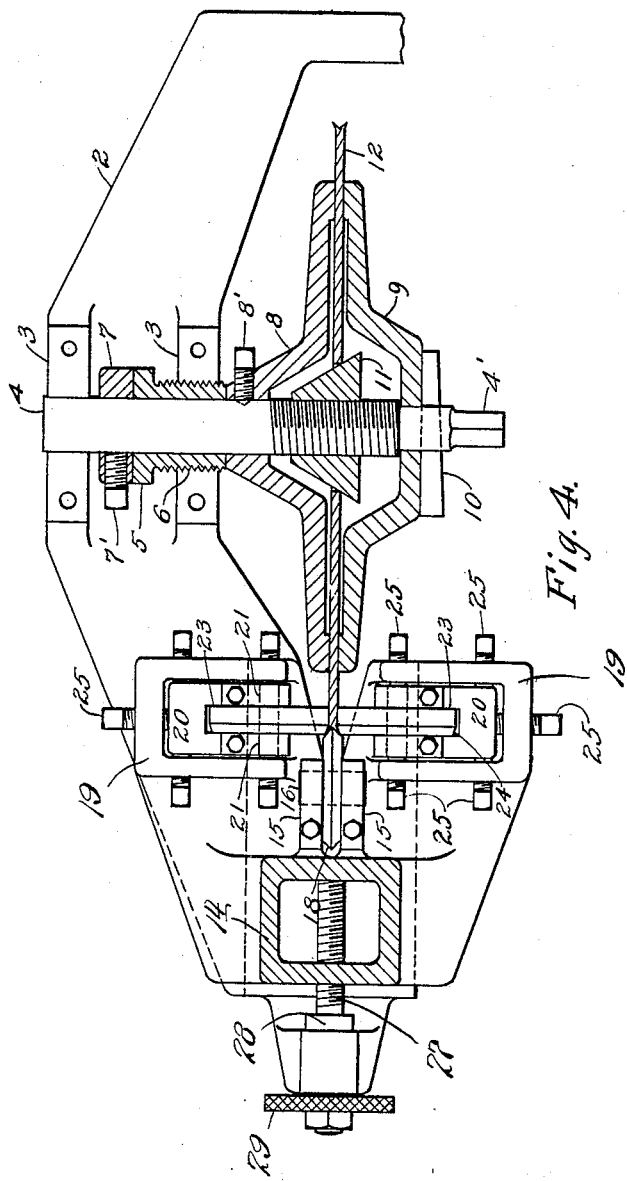

JOSEPH LEE WALKER, OF BATON ROUGE, LOUISIANA.

MACHINE FOR SETTING SAW-TEETH.

1,321,344.  Specification of Letters Patent.  Patented Nov. 11, 1919.

Application filed April 26, 1919. Serial No. 292,771.

*To all whom it may concern:*

Be it known that I, JOSEPH LEE WALKER, a citizen of the United States, residing at Baton Rouge, in the parish of East Baton Rouge and State of Louisiana, have invented a new and useful Machine for Setting Saw-Teeth, of which the following is a specification.

This invention relates to improvements in machines for setting saw teeth, the object of the invention being to provide an improved machine of this character by means of which saw teeth of various forms may be set, side shaped and sharpened on the same machine, and in which the setting, side shaping and sharpening of the teeth may be accomplished in one operation.

A further object of the invention is to generally improve the structure of machines of the character set forth and to provide a machine that is comparatively simple in construction, economical to manufacture and highly efficient in operation.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a side view of my improved machine with a saw in position thereon ready to be operated on;

Fig. 2 is a plan view, partly in section, of the grinding wheel, the saw being shown broken away;

Fig. 3 is an end view showing the slidable carriage on which is mounted the setting and sharpening rollers or wheels; and Fig. 4 is a longitudinal section taken on the line 4—4 of Fig. 1.

The same characters of reference designate the same parts in the different figures of the drawings.

In the embodiment herein illustrated a suitably formed bed plate 2 is provided, this bed plate being adapted to be supported in any suitable manner upon a bench or other support. The bed plate 2 is provided at one side thereof with a pair of bearing blocks 3 forming an elongated bearing in which is rotatably mounted a mandrel 4. A bushing 5 is secured in said bearing, and for permitting endwise adjustment of the mandrel the bushing is threaded into one of the bearing blocks 3, as shown at 6, Fig. 4, a collar 7 being secured to the mandrel by means of a set screw 7' in position to abut against said bushing to prevent lengthwise movement of the mandrel in one direction. On the opposite side of the bushing 5 a dish-shaped flange 8 is secured to the mandrel by means of a set screw 8'. Oppositely disposed on the mandrel and loosely mounted thereon is a second dish-shaped flange 9 adapted to coöperate with the flange 8 for centering the saw, and for clamping the flanges 8 and 9 together with the saw between them I provide a slot or aperture in the mandrel through which passes a wedge-shaped member 10. The mandrel is screw-threaded for a portion of its length and adapted to receive an interiorly threaded cone-shaped member 11 for centering saws having various sizes of openings. Fig. 4 shows a saw 12 clamped between the flanges 8 and 9 and having the cone member 11 screwed on the mandrel to centering position. The mandrel is squared at its end, as shown at 4' for operation by means of a suitable crank handle.

The bed plate 2 is provided at one end thereof with a dovetailed guideway 13 on which is adapted to slide a carriage 14, hereinafter termed the main carriage, and which is provided approximately midway thereof with a pair of bearing blocks 15 in which is mounted for rotation a shaft 16 carrying a spreading wheel 17 having its edge beveled from both sides thereof toward the center, as shown at 18, thereby to adapt it for spreading the teeth of the saw. The carriage 14 has formed thereon, forward of the bearing blocks 15, a pair of U-shaped housings 19, one at each side of the spreading wheel 17, within each of which housings is placed a U-shaped block 20 provided with bearings 21 in which is journaled a shaft 22 carrying a side shaping roller 23 having its edge beveled at one side thereof, as shown at 24, and adapted to abut against the saw teeth that are being spread by the spreading wheel. Each of the blocks 20 is maintained in place by means of set screws 25 threaded in the walls of the housing 19. By this construction the side shaping rollers may be adjusted to suit any thickness of saw, and may also be adjusted to the proper angle with relation to the saw.

For adjusting the carriage 14 toward and away from the saw, thereby to adapt it to saws of different diameters, the bed plate 2 is provided at the end thereof with an upwardly extending bracket 26 having a bearing in which is rotatably mounted an adjusting screw 27 that is threaded into the carriage 14, a collar 28 being secured on the screw for preventing longitudinal movement of the screw in the bracket 26. A milled head 29 is secured on the end of the screw 27 for permitting rotation thereof by hand.

Extending upwardly from the sliding carriage 14 is a standard 30, on the upper side of which is formed a second dovetailed guideway 31, on which is adapted to slide a carriage 32 having bearing blocks 33 in which is mounted for rotation a shaft 34 carrying a suitable emery grinding wheel 35, having its edge formed to correspond to the shape of the teeth to be ground. A bushing 36 is threaded into one of the blocks for permitting longitudinal adjustment of the shaft 34 for properly centering the grinding wheel in the same manner as described in connection with the bushing 5. The shaft may be provided at one end thereof with a pulley 37 for receiving rotary motion by means of a belt from any convenient source of power. For adjusting the carriage 32 toward and away from the saw independently of the main carriage, the standard 30 is provided with an upwardly extending bracket 38 forming a bearing for an adjusting screw 39, which is threaded in an upstanding lug 40 carried by the carriage 32, a collar 41 being secured on the screw for preventing lengthwise movement thereof with relation to the bracket 38. A pair of arms 42 formed on the standard 30 extend beyond the grinding wheel and into position to straddle the saw, and a pair of set screws 43 are threaded in the arms and adapted to hold the saw steady to center of the emery wheel while the latter is grinding. Of course, it will be understood that the spreading wheel, side shaping rollers and grinding wheel may be of any desired form at their edges, and that such wheels or rollers may be removed and replaced by others to adapt the machine for setting and sharpening saws having any form of teeth whatever. By reason of the various adjustments, the spreading wheel and emery wheel may be advanced and used independently of each other.

The operation of the machine is as follows: The mandrel 4 having been longitudinally adjusted by means of its bushing 5 to suit the thickness of the saw to be spread and ground, the flange 8 is secured thereon and the saw placed with its center opening around the mandrel. The cone 11 is then screwed on the mandrel into engagement with the wall of the opening in the saw, thereby to properly center the latter. The flange 9 is then placed on the mandrel and the wedge 10 driven into the slot, thereby to tightly clamp the saw between the two flanges. The side shaping rollers 23 are then adjusted according to the diameter and thickness of the saw and forced inwardly by means of their set screws 25 into contact with the sides of the saw, their beveled edges being in position to support the teeth against the action of the spreading wheel. The spreading wheel is then forced inwardly against the saw teeth by means of its adjusting screw 27, whereupon two of the teeth are forced outwardly, one to one side and one to the other side, until they are firmly clamped between the spreading wheel and the side shaping rollers. The mandrel may then be rotated by means of a crank handle or in any other suitable manner, until all of the teeth have been spread. The grinding wheel is then set in motion and is adjusted by means of the screw 39 into contact with the teeth of the saw and held there until the proper edge has been formed on the teeth. The grinding wheel is then backed off until the saw has been rotated to bring the next pair of teeth into position to be acted on by the grinding wheel, and this operation is repeated until all the teeth have been ground.

Having thus described my invention, what I claim is:

1. In a machine of the class described, the combination of adjustable means for centering a saw in position to be set, means adjustable radially of said centering means for spreading the teeth of a saw, and means adjustable transversely of the saw when in position to be set for supporting the teeth against the action of the spreading means.

2. In a machine of the class described, the combination of a rotatable mandrel provided with means for centering a saw in position to be set, said mandrel itself being adjustable in the direction of its length, means adjustable radially of the mandrel for spreading the teeth of a saw, and means adjustable transversely of the saw when in position to be set for supporting the teeth against the action of the spreading means.

3. In a machine of the class described, the combination of a rotatable mandrel provided with means for centering a saw in position to be set, said mandrel itself being adjustable in the direction of its length, a spreading wheel adjustable radially of the mandrel for spreading the teeth of a saw, and a pair of rollers adjustable transversely of the saw when in position to be set for supporting the teeth against the action of said spreading wheel.

4. In a machine of the class described, the combination of a rotatable mandrel provided with means for centering a saw in position to be set, means adjustable radially of said mandrel for spreading the teeth of a saw, means adjustable transversely of the saw when in position to be set for supporting the teeth against the action of the spreading means, and means adjustable radially of the mandrel for sharpening the teeth of a saw.

5. In a machine of the class described, the combination of a bed plate, an adjustable bearing carried thereby, a mandrel rotatable in said bearing, a flange secured to said mandrel, a flange slidable on said mandrel, means for clamping said flanges together, means adjustable radially of the mandrel for spreading the teeth of a saw, and means adjustable transversely of the saw when in position to be set for supporting the teeth against the action of said spreading means.

6. In a machine of the class described, the combination of a bed plate, adjustable means supported thereby for centering a saw in position to be set, a carriage mounted on said bed plate and slidable toward and from said centering means, a spreading member mounted for rotation on said carriage, and a pair of side shaping members mounted for rotation on said carriage in a direction at right angles to the direction of rotation of said spreading member.

7. In a machine of the class described, the combination of a bed plate, adjustable means supported thereby for centering a saw in position to be set, a carriage mounted on said bed plate and slidable toward and from said centering means, a spreading member mounted for rotation on said carriage, a pair of side shaping members mounted for rotation on said carriage in a direction at right angles to the direction of rotation of said spreading member, and an adjustable grinding member mounted for rotation on said carriage in the same direction as the spreading member.

8. In a machine of the class described, the combination of a bed plate, an adjustable bearing carried thereby, a mandrel rotatable in said bearing, a flange secured to said mandrel, a flange slidable on said mandrel, means for clamping said flanges together, a cone member adjustable on said mandrel between said flanges, and means for permitting rotation of said mandrel.

9. In a machine of the class described, the combination of a bed plate, an adjustable bearing carried thereby, a mandrel rotatable in said bearing, a flange secured to said mandrel, a flange slidable on said mandrel, means for clamping said flanges together, a cone member adjustable on said mandrel between said flanges, a carriage mounted on said bed plate and slidable toward and from said mandrel, a spreading wheel mounted for rotation on said carriage, a pair of housings carried by said bed plate, a pair of adjustable blocks within said housings, means carried by the housings for adjusting said blocks in the direction of the length of the mandrel and also angularly with relation thereto, a pair of side shaping rollers mounted for rotation in said blocks, a second carriage slidably carried by said first carriage, means for sliding said carriage toward and from the mandrel, a grinding wheel mounted for rotation in said second carriage, and means for rigidly clamping a saw in position to be operated on by said grinding wheel.

In testimony that I claim the foregoing as my own, I have hereto affixed my signature in the presence of two witnesses.

JOSEPH LEE WALKER.

Witnesses:
DAVID B. LOZANO,
BERNADETTE D. CLENEAY.

Copies of this patent may be obtained for five cents each, by addressing the "Commissioner of Patents, Washington, D. C."